United States Patent
Mamidwar et al.

(10) Patent No.: US 8,705,791 B2
(45) Date of Patent: *Apr. 22, 2014

(54) METHOD AND SYSTEM FOR UTILIZING GPS INFORMATION TO SECURE DIGITAL MEDIA

(75) Inventors: Rajesh Mamidwar, San Diego, CA (US); Xuemin Chen, San Diego, CA (US); Robert Brownhill, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,695

(22) Filed: Aug. 16, 2012

(65) Prior Publication Data

US 2013/0011005 A1    Jan. 10, 2013

Related U.S. Application Data

(63) Continuation of application No. 11/945,543, filed on Nov. 27, 2007, now Pat. No. 8,270,664.

(51) Int. Cl.
*G06K 9/00* (2006.01)

(52) U.S. Cl.
USPC .......................................... 382/100; 713/176

(58) Field of Classification Search
USPC .................. 382/100; 713/168, 176, 178, 179; 358/3.28; 380/201
See application file for complete search history.

(56) References Cited

U.S. PATENT DOCUMENTS 6,449,380 B1  9/2002  Acharya et al.
6,687,384 B1  2/2004  Isnardi
(Continued)

FOREIGN PATENT DOCUMENTS

KR  2005/0062243  6/2005
KR  2007/0081843  8/2007
(Continued)

OTHER PUBLICATIONS

Sarmast et al., "Biometric signing of photographs to verify authenticity," *Research Disclosure*, vol. 491, No. 74, Mar. 1, 2005.

(Continued)

*Primary Examiner* — Jason M Repko
*Assistant Examiner* — Shervin Nakhjavan
(74) *Attorney, Agent, or Firm* — Sterne, Kessler, Goldstein & Fox P.L.L.C.

(57) ABSTRACT

A device such as a set-top-box, digital TV, DVD player, multi-media player, cellular telephone or digital cinema player that may handle data such as multimedia data and/or audio/video signals, may determine its location. The device may determine its location based on GPS information and may send its location it to an external entity, for example, a service provider. The device may generate a watermark comprising its determined location and may embed or insert the watermark within the data. AlsoIn addition, the generated watermark may comprise one or more of a unique identifier for the device, a source of the data, for example, a service provider, a date and a time. The watermark may be secured via processing, for example, the watermark may be encrypted prior to being embedded. The data may be compressed when embedding the watermark. The watermark embedding process may be handled via a secure embedded processor and/or secure code.

25 Claims, 6 Drawing Sheets

(56) References Cited

U.S. PATENT DOCUMENTS

| | | | |
|---|---|---|---|
| 6,804,779 B1* | 10/2004 | Carroni et al. | 713/176 |
| 7,084,903 B2 | 8/2006 | Narayanaswami et al. | |
| 7,120,251 B1* | 10/2006 | Kawada et al. | 380/201 |
| 7,190,808 B2* | 3/2007 | Goldberg et al. | 382/100 |
| 7,203,967 B2 | 4/2007 | Chmaytelli et al. | |
| 7,206,585 B2* | 4/2007 | Gilham et al. | 455/450 |
| 7,209,571 B2* | 4/2007 | Davis et al. | 382/100 |
| 7,328,345 B2* | 2/2008 | Morten et al. | 713/176 |
| 8,250,660 B2* | 8/2012 | Levy et al. | 726/26 |
| 8,363,882 B2* | 1/2013 | Landwehr et al. | 382/100 |
| 2002/0017977 A1 | 2/2002 | Wall | |
| 2002/0196942 A1 | 12/2002 | Werner | |
| 2003/0040326 A1* | 2/2003 | Levy et al. | 455/466 |
| 2003/0093665 A1* | 5/2003 | Cooper et al. | 713/156 |
| 2003/0120940 A1 | 6/2003 | Vataja | |
| 2003/0123659 A1 | 7/2003 | Forstrom et al. | |
| 2003/0202659 A1* | 10/2003 | Rodriguez | 380/201 |
| 2003/0215110 A1* | 11/2003 | Rhoads et al. | 382/100 |
| 2004/0005078 A1 | 1/2004 | Tillotson | |
| 2004/0078594 A1 | 4/2004 | Scott | |
| 2004/0091111 A1 | 5/2004 | Levy et al. | |
| 2004/0221244 A1 | 11/2004 | Baldino | |
| 2005/0055574 A1 | 3/2005 | Chmaytelli | |
| 2005/0186965 A1 | 8/2005 | Pagonis et al. | |
| 2006/0143233 A1 | 6/2006 | Pietraski | |
| 2007/0074035 A1 | 3/2007 | Scanlon et al. | |
| 2007/0098172 A1 | 5/2007 | Levy et al. | |
| 2007/0242853 A1 | 10/2007 | Rodriguez et al. | |
| 2007/0292034 A1 | 12/2007 | Tabankin | |
| 2008/0146225 A1* | 6/2008 | Stuart | 455/435.1 |
| 2009/0106556 A1* | 4/2009 | Hamid | 713/176 |

FOREIGN PATENT DOCUMENTS

| | | |
|---|---|---|
| TW | 419242 | 12/2000 |
| TW | 503664 | 9/2002 |
| TW | 522722 | 3/2003 |
| WO | WO 01/76252 | 10/2001 |

OTHER PUBLICATIONS

European Search Report for European Patent Application No. 08020192.4-2223, dated Mar. 6, 2009, 5 pages.

English language abstract of Korean Patent Publication No. 2005/0062243, World Intellectual Property Organization (WIPO) Patent Scope, 1 page (listed as document FP2 on the accompanying form PTO/SB/08A).

English language abstract of Korean Patent Publication No. 2007/0081843, World Intellectual Property Organization (WIPO) Patent Scope, 1 page (listed as document FP3 on the accompanying form PTO/SB/08A).

Office Action directed to related Taiwanese Patent Application No. 097145722, mailed Dec. 16, 2013; 6 pages.

* cited by examiner

METHOD AND SYSTEM FOR UTILIZING GPS INFORMATION TO SECURE DIGITAL MEDIA

CROSS-REFERENCE TO RELATED APPLICATIONS/INCORPORATION BY REFERENCE

The present application is a continuation of and claims benefit to U.S. patent application Ser. No. 11/945,543, filed Nov. 27, 2007, entitled "Method and System for Utilizing GPS Information to Secure Digital Media," which is incorporated by reference herein in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to multimedia data processing. More specifically, certain embodiments of the invention relate to a method and system for utilizing GPS information to secure digital media.

BACKGROUND OF THE INVENTION

Digital Watermarking is a technique utilized to protect digital media from unauthorized use or illegal copying, such as with copyrighted material, for example. Watermarking of digital media may fall into two categories: visible or invisible. Visible watermarks are typically added to digital images to indicate ownership and to thwart unauthorized use of the images. The watermark may comprise the identity of the owner and/or a copyright symbol and date, for example. This type of watermark may be considered a spatial watermark in that the data is embedded spatially in an image, and the watermark signal is distinct from the original image data. Spatial watermarks may not be robust against attacks due to the ability of filtering, removing and/or cropping the data.

Invisible watermarks do not change the image to a perceptible extent. This may be accomplished by minor changes in the least significant bits of the original data. Watermarks that are unknown to the end user may be considered steganographic.

A watermarking process may embed the data in the frequency domain, making it more robust against attack. The technique is somewhat similar to spread spectrum encoding in communications, where the data to embedded may be spread over a multitude of frequencies by modulating the watermark signal with pseudo-noise before adding it to the original data. The low signal amplitude, due to the watermark being invisible, the large bandwidth of the original data (image or video, for example), and the shortness of the watermark message, are all factors that indicate spread spectrum encoding is a logical choice.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method and system for utilizing GPS information to secure digital media, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for utilizing GPS information to secure digital media. Exemplary aspects of the invention may comprise a device enabled for inserting a watermark within an audio and/or video (A/V) signal and/or multimedia data wherein information within the watermark may comprise information regarding the location of the device handling the A/V signal and/or multimedia data. (The terms A/V signal and multimedia data are used interchangeably within this document to indicate any suitable information, for example, information comprising image, audio, text and/or voice data.) The device may be for example a set-top-box (STB), for example a satellite or cable STB, digital TV, DVD player, multi-media player, computer, digital cinema player, cellular telephone and/or or any suitable device that may comprise a GPS receiver and may be enabled to handle multimedia data. The GPS receiver may be enabled to determine the location of the device as well as provide date and/or time information. The device may receive the A/V signal and/or multimedia data from an A/V source, for example, a service provider, and may insert the watermark comprising location information into the A/V signal and/or multimedia data prior to storing, recording and/or rendering the multimedia data. The watermark may be inserted into a compressed A/V signal and/or multimedia data. Additional watermark information may comprise a chip identifier, date and/or time of handling of the A/V signal and/or multimedia data. In addition, information based on GPS data may be communicated to the A/V source such as a service provider or another external entity. In some embodiments of the invention, the watermark information may be secure, for example, the watermark information may be encrypted prior to inserting it into the A/V signal and/or multimedia data. Furthermore, a watermark embedding and/or extraction process may be secure. In this regard, an embedded processor, memory inaccessible from a main CPU and/or trusted code may be utilized for the watermark embedding and/or extraction process.

Figure 1A:
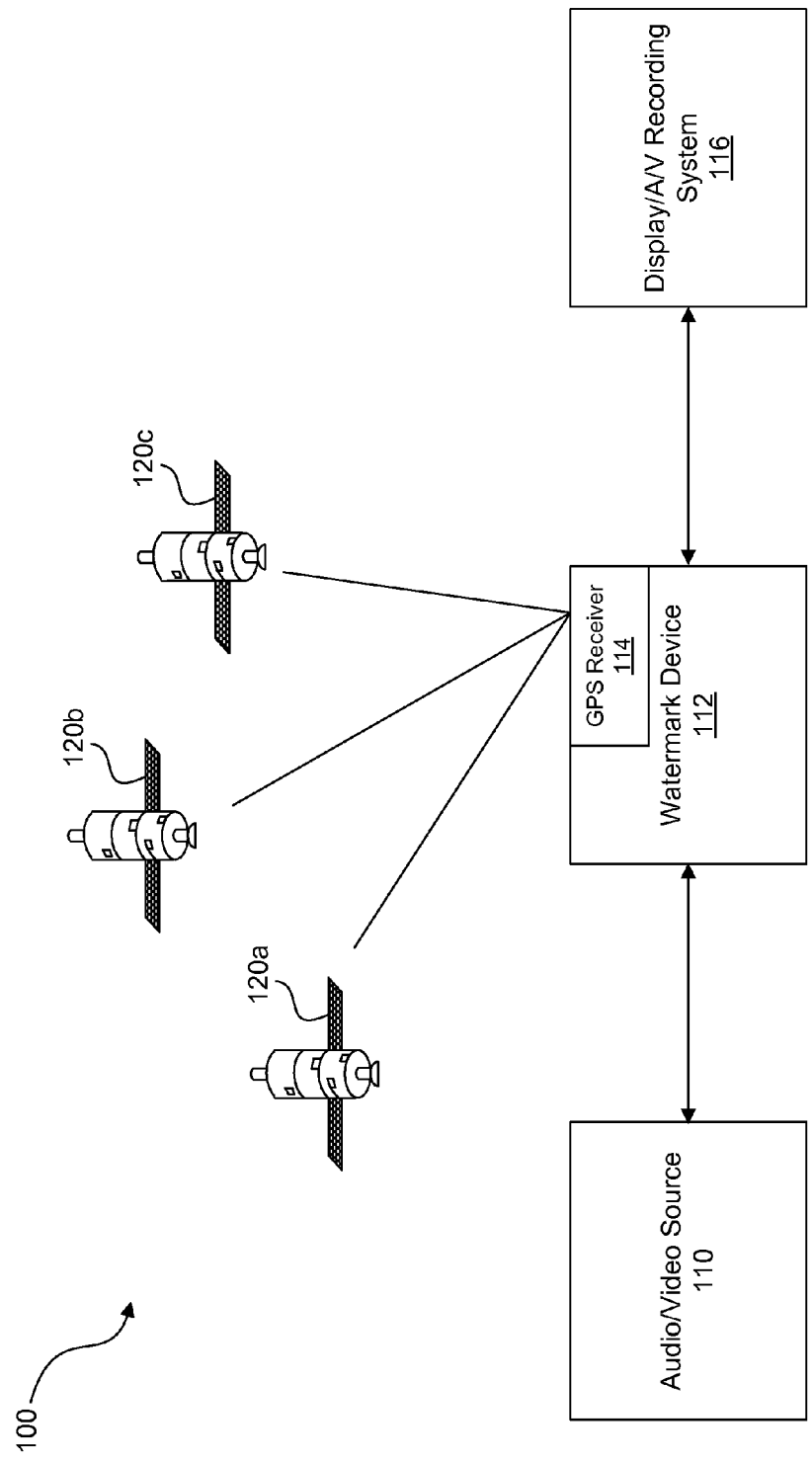
FIG. 1A is a block diagram that illustrates an exemplary audio and/or video system enabled to utilize GPS location information, in accordance with an embodiment of the invention.

FIG. 1A is a block diagram that illustrates an exemplary audio and/or video system enabled to utilize GPS location information, in accordance with an embodiment of the invention. Referring to FIG. 1A there is shown an exemplary audio and/or video (A/V) system 100 comprising an A/V source 110, a watermark embedding device 112 comprising a GPS receiver 114, an A/V display/recorder system 116 and satellites 120a, 120b and 120c.

The A/V source 110 may be communicatively coupled with the watermark embedding device 112 and may comprise suitable logic, circuitry and/or code that may be enabled to distribute A/V signals to the watermark embedding device 112. The A/V source 110 may comprise a server within a service provider network, for example, a cable and/or satellite network. In some embodiments of the invention A/V source 110 may distribute A/V signals via a network such as the internet or a private network for example.

The watermark embedding device 112 may be, for example, a set-top-box (STB) communicatively coupled with the A/V source 110 and the A/V display/recorder system 116. The watermark embedding device 112 may not be limited to an STB application and may be for example a digital TV, DVD player, multi-media player and/or a digital cinema player. The watermark embedding device 112 may comprise suitable logic, circuitry and/or code that may enable it to determine its location and to insert a watermark comprising a representation of its location on A/V signals received from the A/V source 110. In addition, the watermark embedding device 112 may be enabled to extract a watermark from A/V signals. The watermark embedding device 112 may comprise a GPS receiver 114, the latter of which may comprise suitable logic, circuitry and/or code that may be enabled to receive GPS data from one or more GPS satellites and may be enabled to determine the watermark embedding device 112's position from the received GPS data. For example the GPS receiver 114 may determine watermark embedding device 112's position based on ephemeris, signal delay and satellite position.

The A/V display/recorder system 116 may comprise a television and/or video recorder that may comprise suitable logic, circuitry and/or code to receive, display and/or store on one or more forms of media A/V signals comprising a watermark. The A/V display/recorder system 116 may be communicatively coupled with the watermark embedding device 112.

The satellites 120a, 120b and 120c may be for example, GPS satellites that may provide information to the watermark embedding device 112 to enable the device 112 to determine its location. In this regard, each of the satellites 120a, 120b and 120c may transmit a signal that may be received in the GPS receiver 114. The GPS receiver 114 may determine the distance from the watermark embedding device 112 and one or more satellites by measuring the delay between each signal's transmission time and each signal's reception time. Moreover, the signals may carry information such as precise timing information and/or ephemeris information that may indicate a location for the respective satellite 120a, 120b and/or 120c transmitting the signal. If the watermark embedding device 112 receives signals from three or more satellites, it may determine its position from the ephemeris, delay measurements and satellite positions. Input from a service provider and/or long term orbit information (LTO), for example, may enable the watermark embedding device 112 to determine a position with fewer than three satellite signals.

In operation, watermarking data comprising location information determined via the GPS receiver 114 and an A/V signal may be received by the watermark embedding device 112. Accordingly, the watermark embedding device 112 may embed the watermarking data comprising location information within the A/V signal and send the results to storage or to be displayed on the A/V display/recorder system 116 for example. The embedded watermark may protect the multimedia data within the A/V signal from illegal copying or use, for example, such as with copyrighted material. In some embodiments of the invention, the watermarked results may be decompressed prior to being displayed. In addition, the location information may be sent to audio video source 110.

Figure 1B:
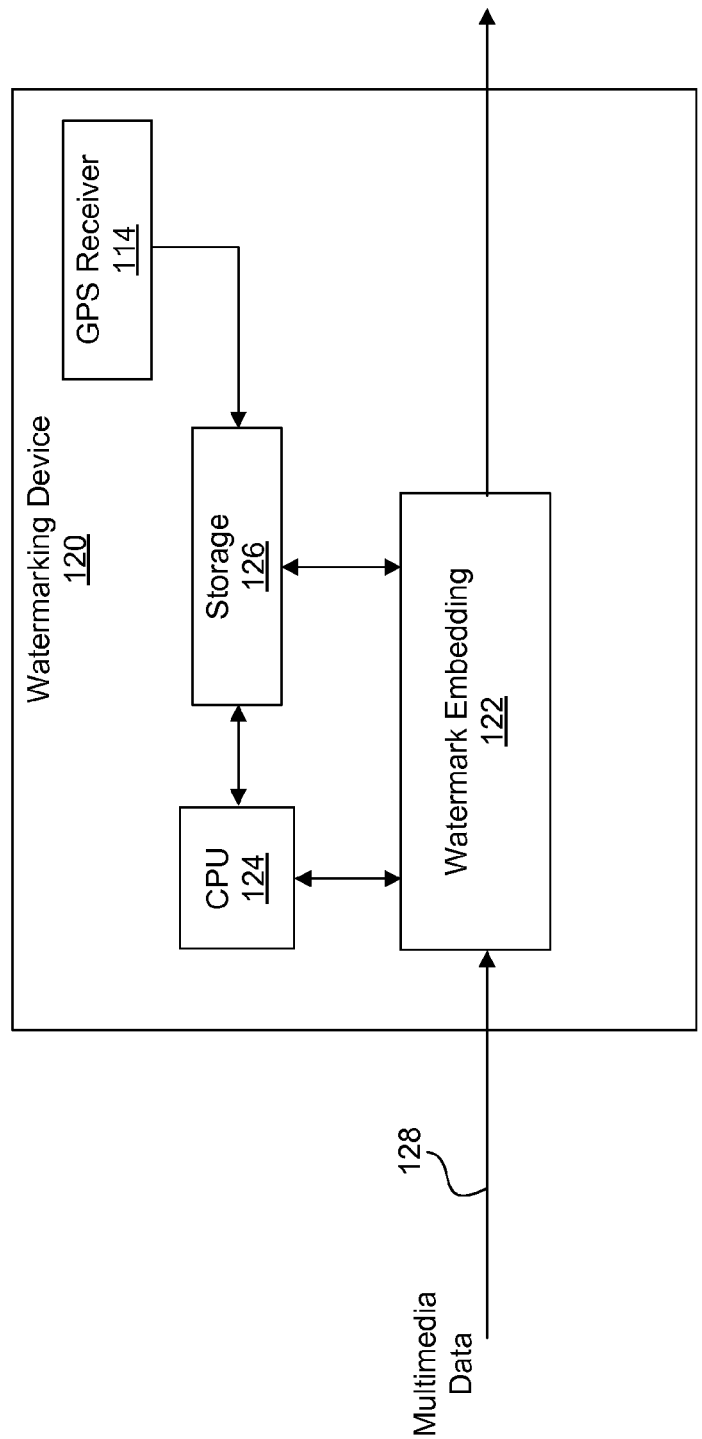
FIG. 1B is an exemplary application of a digital watermarking process utilizing GPS location information, in accordance with an embodiment of the invention.

FIG. 1B is an exemplary application of a digital watermarking process utilizing GPS location information, in accordance with an embodiment of the invention. Referring to FIG. 1B, there is shown a cable input 128, watermark embedding device 120 comprising a GPS receiver 114, watermark embedding block 122, a memory/storage 126 and a CPU 124. The cable input 128 may communicate A/V signals comprising audio, video, data and/or voice, for example.

The watermark embedding device 120 may comprise suitable circuitry, logic and/or code for receiving A/V input signals and generating an output signal that may be stored or displayed. The watermark embedding device 120 may be for example a set-top-box, digital TV, DVD player, multi-media player, computer, digital cinema player and/or or any suitable device that may comprise a GPS receiver and may be enabled to handle multimedia data and may be similar or substantially the same as the watermark embedding device 112 described in FIG. 1A. The memory/storage 126 may comprise suitable circuitry, logic and/or code for storing multimedia data received from the cable input 128 that may have been processed by the watermark embedding block 122. The memory/storage 126 may also be enabled to store data that may be utilized by the CPU 124 for controlling various aspects of operation of the watermark embedding device 120. The CPU 124 may also be enabled to control certain aspects of the watermark embedding block 122, unless for more secure implementations, an embedded CPU may be utilized. Although a cable input 128 is shown, the invention is not so limited. Accordingly, other media inputs such as, for example, a satellite feed may be provided as an input to the watermark embedding device 120.

The GPS receiver 114 may be similar or substantially the same as the GPS receiver 114 described in FIG. 1A.

The watermark embedding block 122 may comprise suitable circuitry, logic and/or code for receiving multimedia data from, for example, the cable input 128 and embedding or extracting a digital watermark within the multimedia data. The digital watermark may comprise for example, information regarding the location of the watermark embedding device 120, identification of the watermark embedding device 120 and/or the source of the multimedia data such that should the multimedia data later be discovered as stolen, the source of the stealing process may be determined, for example. In some embodiments of the invention, the watermark embedding process may be performed on compressed data. Moreover, in some embodiments of the invention, the watermark embedding block 122 may enable extraction of a watermark from multimedia data.

In operation, multimedia data may be communicated to the watermark embedding device 120 via the cable input 128. The watermark embedding device 120 may determine its location via the GPS receiver 114. Watermarking data may be determined based on the location information, a device ID, date, time and/or multimedia data source information for example. The watermark embedding block 122 may embed the watermark data within the received multimedia data and may store the results in the storage 126. In addition, the watermarked multimedia data may be decompressed and communicated to a display.

Watermark embedding may be considered as a function that involves the original media (content) data $\vec{V}$, an embedding key $\vec{K}$, a set of parameters $\vec{P}$ that control the embedding procedure/algorithm, and a message $\vec{M}$ that may be embedded in the video and/or audio. The message data $\vec{M}$ may comprise location information and may be considered as a sequence of bits. The set of parameters $\vec{P}$ may contain, among other things, the so-called watermark embedding factor, i.e. a parameter that controls the amount of degradation that may be inflicted on the original media data by the watermark. The output of the watermark embedding function comprise watermarked data $\vec{W}$. Thus, the watermark embedding function may be of the following form:

$$\vec{W} = \vec{f}(\vec{V}, \vec{K}, \vec{M}, \vec{P}).$$

Figure 2:
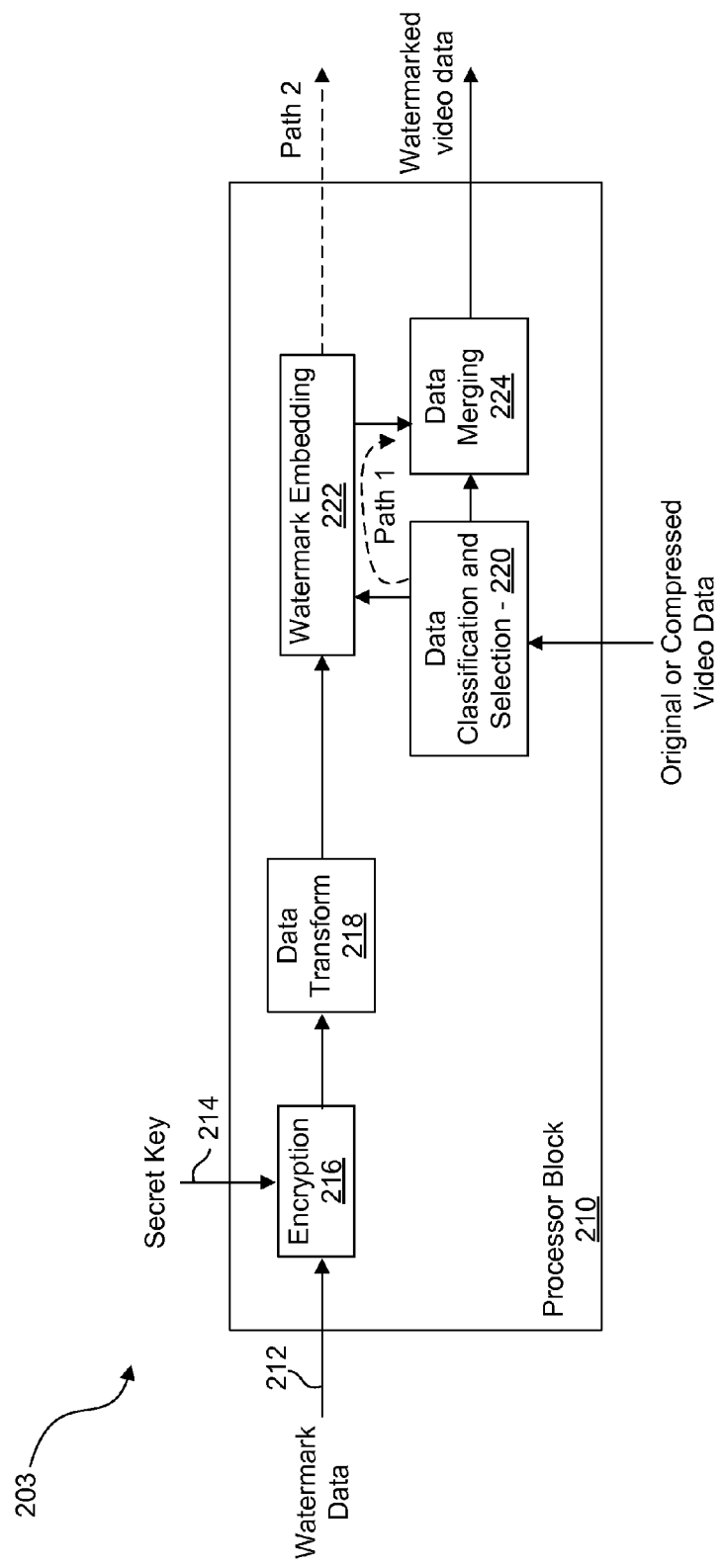
FIG. 2 is a block diagram illustrating an exemplary process for embedding a watermark comprising location information, in accordance with an embodiment of the invention.

FIG. 2 is a block diagram illustrating an exemplary process for embedding a watermark comprising location information, in accordance with an embodiment of the invention. Referring to FIG. 2, there is shown a processor block 210, watermark data 212 and a secret key 214, an encryption block 216, a data transform block 218, watermark embedding block 222, a data classification and selection block 220 and a data merging block 224.

The processor block 210 may control various aspects of operation for the watermark embedding device 120 described in FIG. 1B. The processor block 210 may also be enabled to control aspects of a watermark embedding and/or extraction process. In some embodiments of the invention, the watermark embedding process may be protected by secure operations. In this regard, the processor block 210 may comprise a security processor to control the watermark embedding process and/or an on-chip embedded CPU that may utilize protected code for the watermark embedding process, for example.

The encryption block 216 may comprise suitable circuitry, logic and/or code that may enable encryption of the watermark data 212 utilizing the secret key 214. The encryption block 216 may generate an output signal that may be communicatively coupled to the data transform block 218. In another embodiment of the invention, the encryption block 216 may be disabled and the watermark data 212 may be communicated directly to the data transform block 218.

The data transform block 218 may comprise suitable circuitry, logic and/or code that may enable transforming of data to a form such that it may be inserted into a video stream of data that may be compressed, for example. The data transform block 218 may be communicatively coupled to the watermark embedding block 222.

The watermark embedding block 222 may comprise suitable circuitry, logic and/or code that may enable embedding the watermark data into a video stream that may be compressed. The watermark embedding block 222 may receive as input, data transformed watermark data from the data transform block 218 and an output signal from the data classification and selection block 220.

The data classification and selection block 220 may comprise suitable circuitry, logic and/or code that may enable classifying video data and selecting portions the video data from a received video stream to determine at what frequency and/or what portion of the video data may require a watermark to be embedded. In this manner, a watermark may be embedded in a video stream without causing visible artifacts of the watermark. In some embodiments of the invention, the data classification and selection block 220 may receive encoded video as an input.

The data embedding block 222 may comprise suitable circuitry, logic and/or code that may enable embedding watermark data into a video stream. The data embedding block 222 may receive as inputs watermark data via the data transform block 218 and the video data from the data classification and selection block 220.

In instances where no watermark may be required, the video signal may bypass the data embedding block 222 and may be communicated directly to the data merging block 224.

The data merging block 224 may comprise suitable circuitry, logic and/or code that may enable merging of the signal that by-passed the data embedding block 222 and did not receive watermarking with the video signal that did receive a watermark in the data embedding block 222. The resulting merged video stream may be communicated back to a video decoder if decoding is required, for example. This data path may be indicated by Path 1 in FIG. 2.

In operation, watermarking data 212 may comprise location information and/or other identifying information and may be received by the processor block 210. The watermark 212 may be secured via the encryption block 216 utilizing the secret key 214. The encrypted watermarking data may be passed to the data transform block 218 wherein encrypted watermark data may be formatted for the watermark embedding process. The formatted watermark data may be passed to the watermark embedding block 222. The watermark embedding block 222 may also receive video data via the data classification and selection block 220 and may embed watermark data into the video data. In instances where portions of the video data bypassed the watermark embedding block 222, the watermarked video data may be passed to the data merging block 224 for merging portions of video data comprising a watermark and portions of video data that bypassed the watermark embedding block 222. Watermarked video data may be output for additional processing, storage and/or rendering.

Figure 3A:
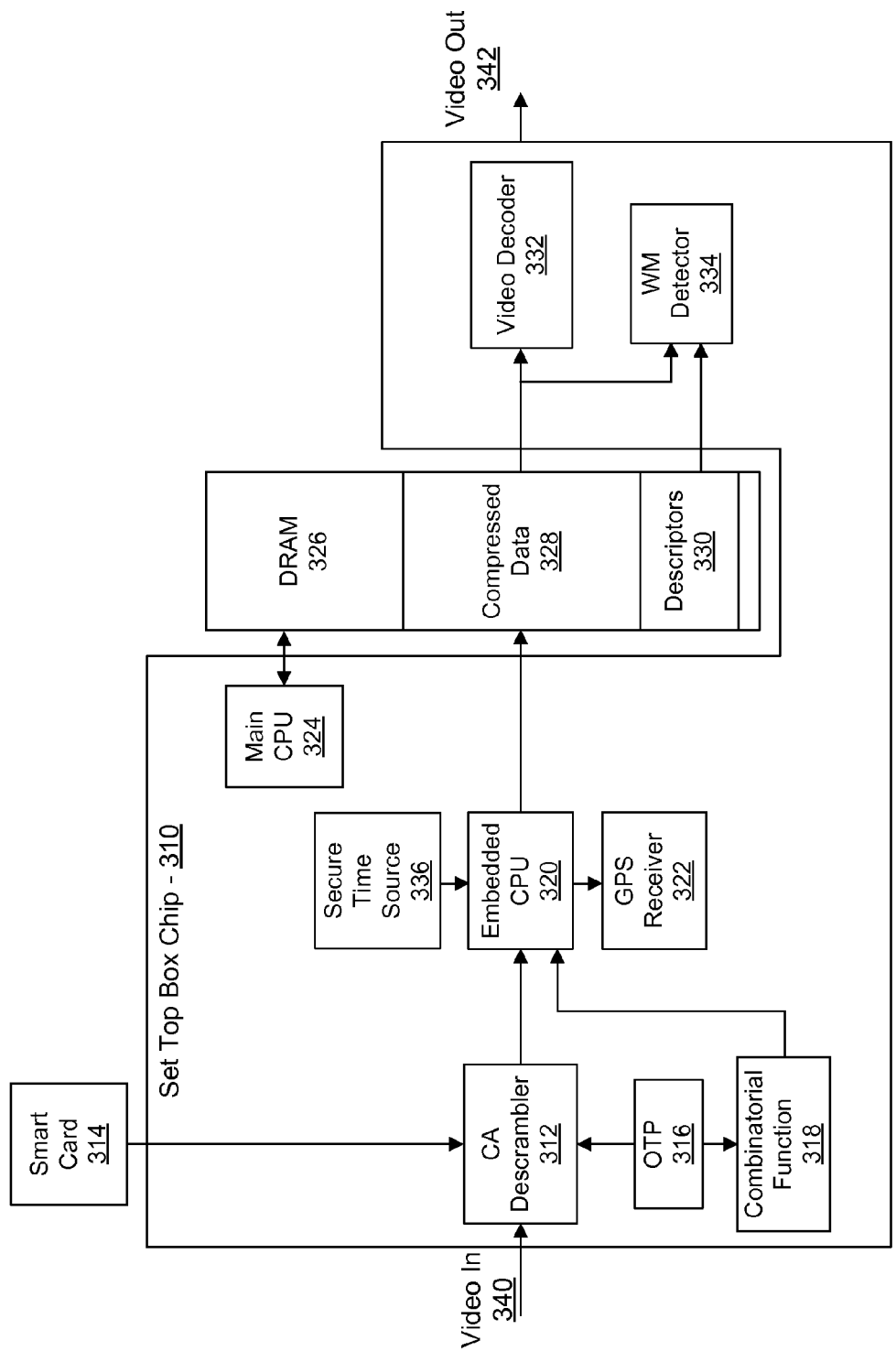
FIG. 3A is a block diagram illustrating an exemplary implementation of a watermarking system utilizing GPS information on a set-top-box, in accordance with an embodiment of the invention.

FIG. 3A is a block diagram illustrating an exemplary implementation of a watermarking system utilizing GPS information on a set-top-box, in accordance with an embodiment of the invention. Referring to FIG. 3A, there is shown a set-top-box chip 310, a smart card 314 and a DRAM 326. The set-top-box chip 310 may comprise a conditional access (CA) descrambler 312, a one-time programmable (OTP) memory 316, a combinational function block 318, an embedded CPU 320, a GPS receiver 322, a main CPU 324, a video decoder 332, a watermark detector 334 and a secure time source 336. There is also shown input and output signals, video-in 340 and video out 342.

The smart card 314 may comprise suitable circuitry, logic and/or code that may enable storage of data for the descrambling of the received video-in 340. The data stored in the smart card 314 may comprise CA descrambling keys or service provider specific data, for example.

The CA descrambler 312 may comprise suitable circuitry, logic and/or code that may enable conditional access descrambling of received video signals such as the video-in 340 signal. The CA descrambler 312 may securely receive as input, the input signal video-in 340, CA descrambling keys and/or service provider information such as service provider identification and/or content owner of the video-in 340 signal. The CA descrambler 312 may securely receive the input information from, for example, the service provider, the smart card 314 and/or the OTP 316. In this regard, the securely received information may be protected and securely controlled such that it cannot be altered or removed by any unauthorized user and/or processor such as the main CPU 324. Video signals may be CA scrambled by a service provider to control access to content, allowing authorized users only.

The OTP memory 316 may comprise suitable circuitry, logic and/or code that may enable storage of unique identifier data specific to the set-top-box chip 310, for example, a chip ID, such that an embedded watermark may comprise information about the source of the data. Additionally, the OTP memory 316 may store keys to be utilized by the CA descrambler 312.

The combinational function block 318 may comprise suitable circuitry, logic and/or code that may enable combining, or scrambling of unique identifier data stored in the OTP 316 with a combinatorial function. The resulting unique ID 344 may be communicated to the embedded CPU 320 to be included with the GPS information in the watermark inserted into the video data. In some embodiments of the invention, the GPS information may be communicated to the combinatorial function 318 and combined with the unique identifier data prior to communicating the combinatorial function 318 result to the embedded CPU 320.

The embedded CPU 320 may comprise suitable circuitry, logic and/or code that may enable control of the watermark embedding process. The embedded CPU 320 may be entirely separate from the main CPU 324 so that software code from third parties, or hackers, may not affect the watermark embedding process. Accordingly, the embedded CPU 320 may utilize trusted code only, which may comprise code stored within the set-top-box chip 310 not controllable by the main CPU 324 or related externally sourced code. The trusted code may be stored on-chip or in a secure memory such as a hashed or locked memory. The embedded CPU may generate and insert the watermark 346 in the video data received from the CA descrambler 312.

In another embodiment of the invention, the embedded CPU 320 may insert the descriptors 330 in the DRAM 326, which may be utilized by the watermark detector 334 to identify the location of the watermarks in the video data and verify that they were properly inserted. The descriptors 330 may not be accessed by the main CPU 324, thus increasing the security level of the set-top-box chip 310. Additionally, the embedded CPU 320 may be enabled to insert watermark video before or after storage in the compressed data 328 of the DRAM 326.

The GPS receiver 322 may be similar or substantially the same as the GPS receiver described in FIGS. 1A and 1B. The GPS receiver 322 may be communicatively coupled with the embedded CPU 320. In addition, the GPS receiver 322 may comprise suitable logic, circuitry and/or code to determine the location of the set-top-box chip 310 and may securely communicate location, date and/or time information to the embedded CPU 320 and/or the combinatorial function 318 for utilization within watermark data.

The secure time source 336 may be comprise suitable logic, circuitry and/or code to provide date and/or time information to be utilized within the watermark data. The date and/or time information may be securely controlled such that it may not be altered or removed by any unauthorized user and/or processor such as the main CPU 324. In some embodiments of the invention, the source of the date and/or time information may be the GPS receiver 322.

The main CPU 324 may comprise suitable circuitry, logic and/or code that may enable overall functional control of the set-top-box chip 310. The main CPU 324 may access the DRAM 326, but may not have access to the compressed data 328 or the descriptors 330 in the DRAM 326. For example, the main CPU 324 may be utilized to update and/or modify programmable parameters and/or values in a plurality of components, devices, and/or processing elements in the set-top-box chip 310.

The DRAM 326 may comprise suitable circuitry, logic and/or code that may enable storage of code to be used by the CPU 324 for control of the set-top-box chip 310. The DRAM 326 may also comprise the compressed data 328 and the descriptors 330. The compressed data 328 region of the DRAM 326 may comprise compressed and watermarked video data, and the descriptor 330 section of the DRAM 326 may comprise data that may be utilized by the watermark detector 334 to determine the location of the watermarks to verify that the watermarks were properly inserted. The compressed data 328 and the descriptors 330 may not be accessed by the main CPU 324, and may only be accessed by the embedded CPU 320, which may enhance system security.

The video decoder 332 may comprise suitable circuitry, logic and/or code that may enable decoding video data for display on a monitor and/or television. The video decoder 332 may receive as an input the compressed data 328 stored in the DRAM 326 and generate an output signal, video out 342.

The watermark detector 334 may comprise suitable circuitry, logic and/or code that may enable detecting the watermark 346 embedded in the video signal by the embedded CPU 320. By comparing the measured watermark to the descriptors 330 stored in the 330, the watermark detector 334 may verify the proper functioning of the watermark process in the set-top-box chip 310.

In operation, a CA scrambled video-in 340 signal may be communicated to the CA descrambler 312. The descrambler 312 may utilize descrambling keys and/or unique identifier data from the smart card 314 and/or the OTP memory 316 to descramble the signal video-in 340. The embedded CPU 320 may receive the descrambled video-in 340 signal and may determine whether to insert a watermark on it. The embedded CPU 320 may generate a watermark based on one or more of a plurality of data elements comprising for example, the set-top-box location, date and/or time the video-in 340 signal is being handled by the set-top-box, the unique set-top-box ID 344, the service provider and content owner. In this manner, stolen video content may be identified and/or traced back to a specific set-top-box, location date and/or time where the stolen content may have been processed, rendered and/or copied. The embedded CPU 320 may also store the descriptors 330 in the DRAM 326 for watermark verification by the watermark detector 334. The watermarked video signal may be further processed and/or stored as the compressed data 328 in the DRAM 326 or other storage media.

The watermarked video signal may be received by the video decoder 332 and the watermark detector 334. The watermark detector 334 may utilize the descriptors 330 in the DRAM 326 to verify the watermark detected in the watermarked video signal. In instances where the watermark detector 334 determines that the watermark detected in the watermarked video signal may not match the descriptors 330 in the DRAM 326, the set-top-box chip 310 may be disabled. The video decoder 332 may decode the watermarked video signal generating an output signal, video out 342, for display.

Figure 3B:
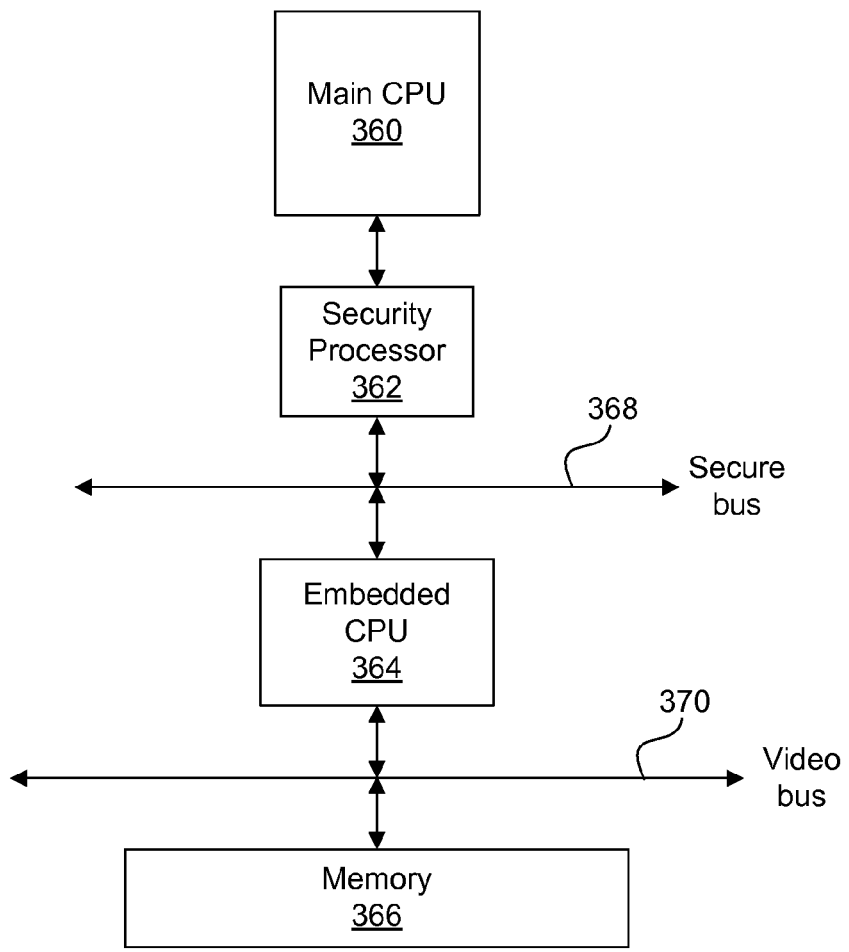
FIG. 3B is a block diagram of an exemplary secure watermark insertion implementation, in accordance with an embodiment of the invention.

FIG. 3B is a block diagram of an exemplary secure watermark insertion implementation, in accordance with an embodiment of the invention. Referring to FIG. 3B, there is shown a main CPU 360, a security processor 362, an embedded CPU 364, a memory region 366, a secure bus 368 and a video bus 370.

The main CPU 360, the embedded CPU 364 and the memory region 366 may be similar or substantially the same as the main CPU 324, the embedded CPU 320 and the memory region 328 described with respect to FIG. 3A. The main CPU 360 may configure the watermark insertion by the embedded CPU 364 via the security processor 362 and may also perform functions critical to the set-top-box chip 310, described with respect to FIG. 3A.

The security processor 362 may comprise suitable circuitry, logic and/or code that may enable secure communication between the main CPU 360 and the secure bus 368. For example, the main CPU 360 may execute software code from various external sources and unknown users, however, the security processor 362 may enable only allowed code to be communicated to the secure bus 368. In addition, the security processor may enable protection of secure watermark data, for example, date, time, a set-top-box chip 310 identifier and/or location information, such that the watermark data may not be modified or deleted by an any unauthorized user or processor such as the main CPU 360.

The secure bus 368 may comprise a communication bus that may be enabled to communicate secure commands between the security processor 362 and the embedded CPU 364. The video bus 370 may comprise a communication bus that may enable the communication of video data to the memory region 366. In addition, the embedded CPU 364 may access the memory region 366 via the video bus 370.

In operation, a video signal may be received via the video bus 370. The secure embedded CPU 364 may insert a watermark before the data may be stored in the memory region 366. The embedded CPU 364 may receive control signals from the security processor 362 via the secure bus 368. Watermark data encryption may be performed by the security processor 362 in instances where encryption of the watermark may be desired. In addition, the main CPU 360 may generate host signals to be communicated to the embedded CPU 364 via the security processor 362 and the secure bus 368. The security processor 362 may ensure that only specific allowed commands may be communicated to the embedded CPU 364.

In an embodiment of the invention, software code that may be executed on the embedded CPU 364 may be signed and verified before being downloaded from memory, such as from a flash memory. The signature verification may correspond to set-top-box chip 310 specific information to verify that code to be executed on the embedded CPU 364 may be legitimate and authorized for the set-top-box chip 310.

Figure 4:
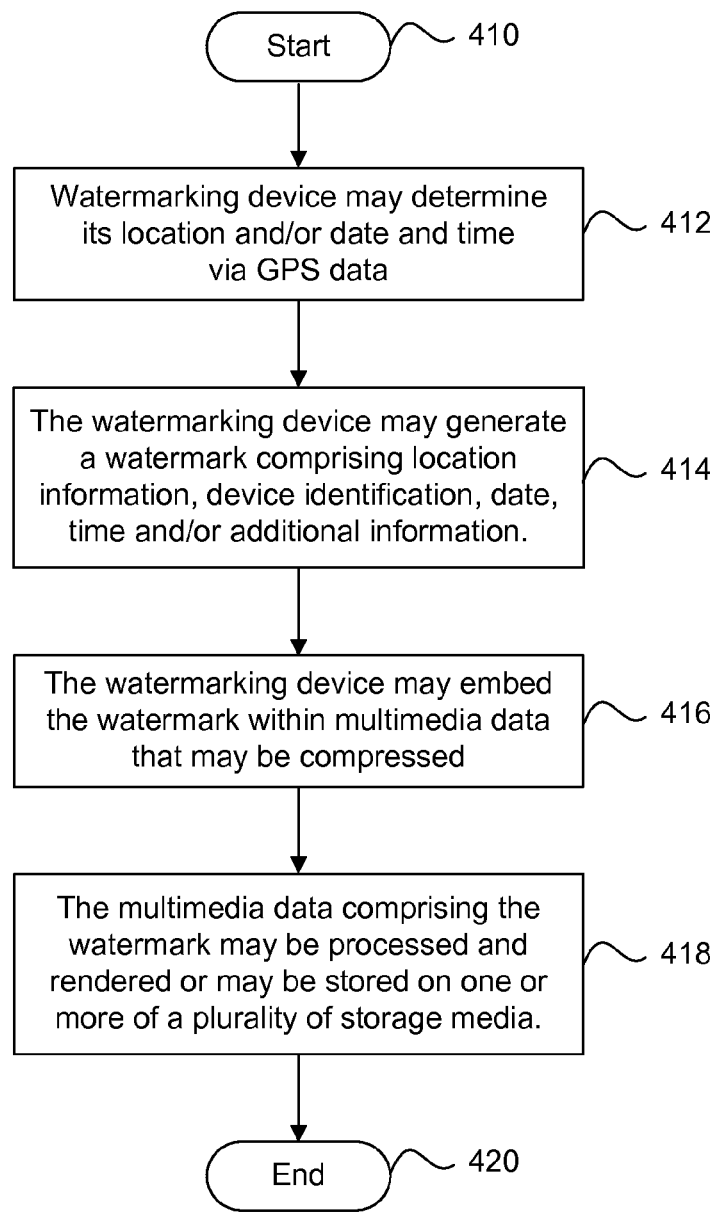
FIG. 4 is a flow chart that illustrates exemplary steps for embedding a watermark into multimedia data utilizing GPS location information, in accordance with an embodiment of the invention.

FIG. 4 is a flow chart that illustrates exemplary steps for embedding a watermark into multimedia data utilizing GPS location information, in accordance with an embodiment of the invention. Referring to FIG. 4, there is shown a flow chart wherein step 410 refers to the beginning of a watermarking process. In step 412, a device such as the watermarking device 120 shown in FIG. 1B may determine its location utilizing GPS data. In step 414, the watermarking device 120 may generate a watermark comprising a representation of the determined location, and additional information such as a unique device ID, source of multimedia data, date and/or time, for example. In step 416, the device 120 may receive multimedia data and embed the generated watermark within the received multimedia data. In some embodiments of the invention, the received multimedia data may be compressed. In step 418, the watermarking device 120 may store the watermarked multimedia data and/or may further process the multimedia data and/or may render it. Step 420, is an end step.

In some embodiments of the invention, a device that may handle data such as the watermarking device 120 that may handle multimedia data 128 described in FIG. 1B, may determine its location. The watermarking device 120 may determine its location based on GPS information and may send a representation of its location to an external entity for example a service provider. The watermarking device 120 may generate a watermark comprising a representation of its determined location and may embed the watermark within the multimedia data 128. In addition, the generated watermark may comprise one or more of a unique identifier for the watermarking device 120, a source of the multimedia data 128, for example, a service provider, a date and a time. The watermark may be secured via, for example, encryption prior to being embedded within the multimedia data 128. The multimedia data 128 may be compressed when embedding the watermark. The watermark embedding process may be handled via a secure embedded processor and/or secure code.

Certain embodiments of the invention may comprise a machine-readable storage having stored thereon, a computer program having at least one code section for utilizing GPS information to secure digital media, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for marking data, the method comprising:
receiving multimedia data and information about a location of a first device based on global positioning system (GPS) data, by said first device via a network from a single source;
generating by said first device a watermark comprising a representation of said location of said first device; and
embedding by said first device said generated watermark with said representation of said location of said first device within said received multimedia data.

2. The method according to claim 1, comprising embedding within said watermark one or more of a unique identifier of said first device, a source of said multimedia data and information about said location of said first device based on GPS, a date and a time.

3. The method according to claim 2, further comprising securing one or more of said representation of said location of said first device, said unique identifier of said first device, said source of said multimedia data and information about location of said first device based on GPS, said date, said time and said generated watermark.

4. The method according to claim 1, comprising embedding said generated watermark within compressed data.

5. The method according to claim 1, comprising sending said representation of said location of said first device to an entity external to said first device.

6. The method according to claim 1, comprising embedding said watermark within said received multimedia data via one or more of a secure embedded processor and secure code.

7. The method according to claim 1, further comprising one or more of storing, processing and distributing said received multimedia data comprising said embedded watermark.

8. The method according to claim 1, wherein said generated watermark is an invisible watermark.

9. The method according to claim 1, wherein said first device comprises one or more of a set-top-box, an audio video display system, a digital TV, a DVD player, a multi-media player and a digital cinema player.

10. The method according to claim 1, wherein the information is long term orbit (LTO) data.

11. A system for marking data, the system comprising: one or more circuits for use in a first device that handles processing of multimedia data and information about a location of said first device based on global positioning system (GPS) data, wherein said one or more circuits are operable configured to:
receive, by said first device via a network from a single source, said multimedia data and information about said location of said first device based on GPS data;
generate by said first device a watermark comprising a representation of said location of said first device; and
embed by said first device said generated watermark with said representation of said location of said first device within said received multimedia data.

12. The system according to claim 11, wherein said one or more circuits are configured to embed within said watermark, one or more of a unique identifier for said device, a source of said multimedia data and information about said location of said first device based on GPS data, a date and a time.

13. The system according to claim 12, wherein said one or more circuits are configured to secure one or more of said representation of said location of said first device, said unique identifier for said first device, said source of multimedia data and information about said location of said first device based on GPS data, said date, said time and said generated watermark.

14. The system according to claim 11, wherein said one or more circuits are configured to embed said generated watermark within compressed data.

15. The system according to claim 11, wherein said one or more circuits are configured to send said representation of said location of said first device to an entity external to said first device.

16. The system according to claim 11, wherein said one or more circuits are configured to embed said watermark within said multimedia data via one or more of a secure embedded processor and secure code.

17. The system according to claim 11, wherein said one or more circuits are configured to enable one or more of storing, processing, and distributing said processed multimedia data comprising said embedded watermark.

18. The system according to claim 11, wherein said generated watermark is an invisible watermark.

19. A non-transitory machine-readable storage having stored thereon, a computer program having at least one code section for marking data, the at least one code section being executable by a machine for causing the machine to perform steps comprising:
receiving, by a first device via a network from a single source, multimedia data and information about a location of said first device based on global positioning system (GPS) data;
generating by said first device a watermark comprising a representation of said location of said first device; and
embedding by said first device said generated watermark with said representation of said location of said first device within said received multimedia data.

20. The non-transitory machine-readable storage according to claim 19, wherein said at least one code section further comprises code that enables:
embedding within said watermark, one or more of a unique identifier of said first device, a source of said multimedia data and information about said location of said first device based on GPS data, a date and a time; and
securing one or more of said representation of said location of said first device, said unique identifier of said first device, said source of said multimedia data and information about said location of said first device based on GPS data, said date, said time and said generated watermark.

21. The non-transitory machine-readable storage according to claim 19, wherein said at least one code section comprises code that enables embedding said generated watermark within compressed data.

22. The non-transitory machine-readable storage according to claim 19, wherein said at least one code section further comprises code that enables sending said representation of said location of said first device to an entity external to said first device.

23. The non-transitory machine-readable storage according to claim 19, wherein said at least one code section comprises code that enables embedding said watermark within said data via one or more of a secure embedded processor and secure code.

24. The non-transitory machine-readable storage according to claim 19, wherein said at least one code section further comprises code that enables one or more of storing, processing and distributing said processed multimedia data comprising said embedded watermark.

25. The non-transitory machine-readable storage according to claim 19, wherein said generated watermark is an invisible watermark.

* * * * *